Feb. 28, 1961   J. C. ANTELL   2,972,761
HEAT SEALING PROCESS FOR RIB STRIPPING
Filed March 11, 1958
Fig. 1
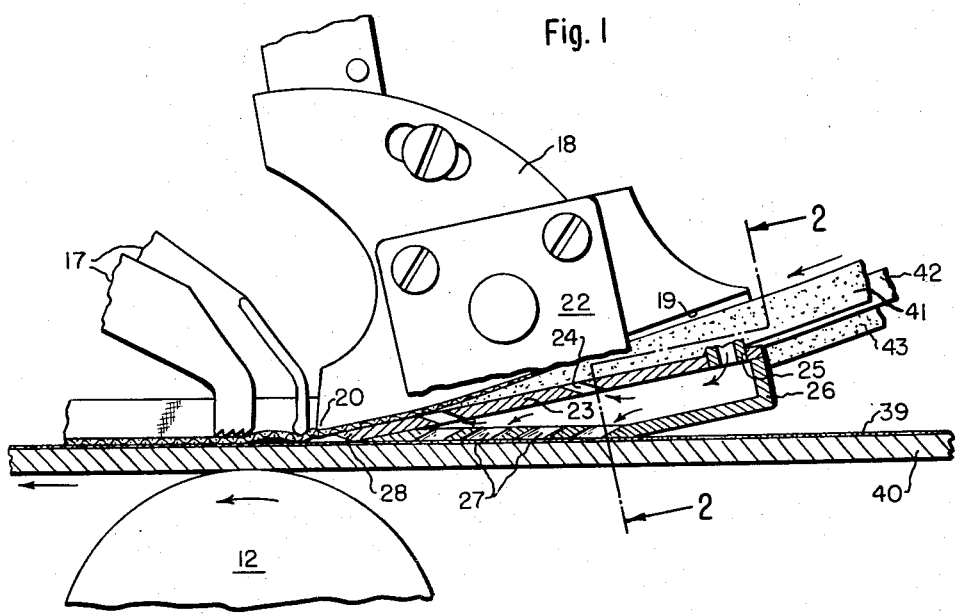
Fig. 2
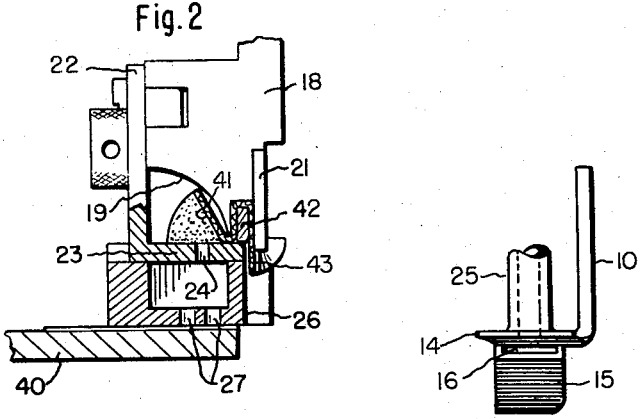
Fig. 4
Fig. 3
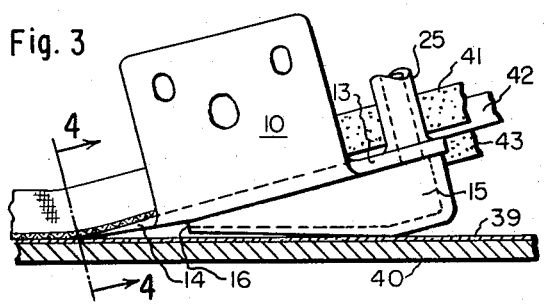
INVENTOR.
Joseph C. Antell.
BY
Kenway, Jenney, Witter & Hildreth
Attys.

United States Patent Office 2,972,761
Patented Feb. 28, 1961

2,972,761
HEAT SEALING PROCESS FOR RIB STRIPPING

Joseph C. Antell, Lynn, Mass., assignor to Prime Manufacturing Company, Lynn, Mass., a corporation of Massachusetts Filed Mar. 11, 1958, Ser. No. 720,711
2 Claims. (Cl. 12—146)

This invention relates to the preparation of welt insoles by adhesively attaching the required sewing rib to otherwise flat insole blanks. The invention comprises a new and improved process of heat sealing the rib stripping to the insole and novel mechanism for carrying out the process.

The shoemaking industry constantly demands an adhesive bond or union of rib and insole of greater and greater strength and permanence in use as well as a bonding that will unite the rib stripping quickly and securely to insole blanks of synthetic composition which replace leather insoles in certain types of footwear.

The present invention fills this longstanding want by providing a practical shoemaking process characterized by the employment of heat-activatable cement in securing the rib to the insole. It has been found that the process may be carried out successfully by heating the opposed faces of an insole and rib stripping as these elements, coated with a heat-activatable cement, are brought progressively into engagement. The opposed faces of these two elements are thus activated and a permanent heat seal bond created by pressing them together preferably as a part of the work-feeding operation.

A typical machine capable of carrying out the above process is characterized by rotary means for supporting from beneath an insole blank coated with heat-activatable cement on its upper face and means for guiding rib stripping having a similarly coated face convergently and progressively into contact with the insole, in combination with means for utilizing hot air, or heated metal walls for activating the coated faces.

As herein shown a wedge-shaped guide member having a guiding surface for the rib stripping is utilized for the double function of properly guiding the stripping into contact with the sole blank and also of heating the coated faces of both the stripping and sole blank.

Such a machine is more fully shown and described in my prior Patent Number 2,875,455, granted March 3, 1959, on co-pending application Serial No. 639,533, filed February 11, 1957, of which the present application is a continuation-in-part. The process of my invention may be carried out advantageously with the assistance of that machine but is not in any way restricted to its use. It is characterized by the steps of directing the sole and the rib stripping in convergent paths to a line or point of common contact and meanwhile heating the cement coated surfaces of both the sole and the stripping by hot air directly or by conduction so that both surfaces are activated by the time they are brought into contact.

Going more into detail, my novel process is characterized by the steps of bringing the stripping and sole together at an acute angle in a common line of contact, heating the sole by conduction and hot air as it approaches said common line, and heating the stripping by conduction in an area co-extensive with the heated and activated area of the sole.

These and other features of the invention will be best understood and appreciated from the following description of the process as carried out with the assistance of apparatus shown in the accompanying drawings in which:

Fig. 1 is a view of the combined guiding and heating member and associated parts shown partly in section, Fig. 2 is a sectional view on the line 2—2 of Fig. 1, Fig. 3 is a fragmentary view in elevation showing a heating and guiding member of modified construction, and Fig. 4 is an end view as seen from the line 4—4 of Fig. 3.

The machine parts shown in the drawings are intended to be incorporated and operated in a machine of the type shown in U.S. Patent No. 2,142,332, granted January 3, 1939, in the name of A. R. Ridderstrom, to which reference may be had for further details of the supporting frame upon which the illustrated elements are mounted. The sole supporting roll 12, the feed feet 17, and the segmental carrier plate 18 may be substantially identical to the corresponding parts described in said patent. The guiding mechanism for the rib stripping, including the carrier plate 18, is supported at a fixed level for angular adjustment about the point 20 at which the rib stripping emerges to make its first contact with the underlying sole blank 40. As herein shown the sole 40 is provided with a coating 39 of cement while the rib stripping comprises a fibrous core 42 partially enclosed within an adhesive coated tape 41. The tape is originally folded so that its cemented faces are directed toward the observer as seen in Fig. 1. In passing to the point 20, the portion 41 of the tape is turned or twisted downwardly and inwardly with respect to the core, and the portion 43 upwardly and outwardly so that it extends toward the margin of the sole.

The lower portion of the plate 18 is undercut to provide a lower face 19 which constitutes the top of the passage for the rib stripping and extends spirally substantially to the point 20 of emergence of the stripping. A back plate 21 is secured to the segmental plate 18 in position to form the rear wall of the passage as best shown in Fig. 2.

To the front of the segmental plate 18 is secured an angle plate 22 having a horizontal foot portion 23 provided with perforations 24. The foot 23 of this plate forms the bottom of the rib stripping passage as well as the top or cover of a hot air chamber which is an important part of the guide member as a whole. Hot air is supplied to this chamber through a nipple 25 which extends upwardly from the angle plate 23.

A bottom plate 26 is secured to the angle plate 23. This plate 26 is shaped to enclose and form the sidewalls of the elongated hot air chamber which tapers forwardly and is provided with perforations 27 opening through its bottom face where it makes direct contact with the cement-coated insole blank 40. This member as a whole directs the rib stripping to the insole at an acute angle of about 30° and the lower wall of the bottom plate 26 has an inclined portion at substantially the same angle so that its perforated portion shall bear over considerable area of the sole blank in approaching the point 20. The guide member thus presents fixed converging guiding surfaces of substantial areas of contact for the stripping and insole.

The characteristics of the heat sealing process will be clear from the foregoing description. It will be understood that the insole blank 40 has been provided, before it reaches the machine, with a marginal coating 39 of heat activatable cement. The flange portions 41 and 43 of the rib stripping have also been similarly coated. Hot air supplied through the nipple 25 heats the walls of the chamber 23-26 so that in passing over and under it the cement coatings of the rib stripping and the insole are heated both by conduction and by hot air discharged through the perforations 24 and 27. The activated surfaces make initial contact just beyond the small end 28 of the tapering guide member and at this point they are immediately engaged and pressed into firm contact by the feed feet 17 which are forked to permit free passage of the upstanding rib and to engage the tape 41 on both sides thereof.

In the modified structure of Figs. 3 and 4 the hot air chamber 15 is of substantially the same tapering shape as shown in Fig. 1 but its upper and lower walls have no perforations. It is, however, provided at its smaller end with a flat nozzle 16. The top plate 13 of the chamber is extended forwardly as a thin sheet metal support 14 which extends substantially beyond the nozzle 16 as shown in Fig. 3. The cement coating 39 of the insole is activated by direct conduction from the bottom wall of the hot air chamber as by a hot iron and also by the blast of hot air discharged from the nozzle 16 beneath the forwardly projecting support 14. The cement coating of the stripping is activated by heat transmitted by direct conduction through the heated plate 13 and the extension 14 which directs the stripping to the initial point of contact with the sole.

The hot air chamber 15 acts as a heated iron in activating the cement layer 39 passing beneath it on the insole 40 and also activates the coated faces of the tape passing above it. The thin blade or support 14 is also heated by the chamber 15 and heats the stripping right out to the line of its contact with the insole. The hot air blasted from the nozzle 16 likewise heats the cement-carrying face of the insole out to the same line.

Having thus disclosed my invention and described in detail an illustrative form thereof, I claim as new and desire to secure by Letters Patent:

1. The process of heat sealing cement-coated rib stripping to a sole comprising the steps of advancing the stripping and sole in convergent paths into contact, heating the sole progressively by direct conduction of hot metal, with ironing action in an area spaced rearwardly from its point of intial contact with the stripping, and heating the cement-coated face of the stripping throughout a substantial area thereof in approaching the said point of contact.

2. The process of heat sealing cement-coated rib stripping to an underlying sole characterized by the steps of advancing the stripping and sole in converging paths into contact and thereafter pressing the two together, meanwhile continuously heating the upper surface of the sole by conduction and ironing action in a limited area rearwardly of the point of initial contact, supporting the stripping above the surface of the heated area of the sole as it approaches said point of contact, and heating the supported stripping by hot air.

References Cited in the file of this patent

UNITED STATES PATENTS

| | | |
|---|---|---|
| 2,635,263 | Clark | Apr. 21, 1953 |
| 2,657,405 | Ridderstrom | Nov. 3, 1953 |
| 2,688,759 | Clark | Sept. 14, 1954 |
| 2,790,189 | Griswold | Apr. 30, 1957 |